United States Patent
Brockhaus et al.

(10) Patent No.: US 12,531,931 B2
(45) Date of Patent: Jan. 20, 2026

(54) SYSTEMS AND METHODS FOR CREATING A VIRTUAL KVM SESSION BETWEEN A CLIENT DEVICE AND A TARGET DEVICE

(71) Applicant: Vertiv IT Systems, Inc., Huntsville, AL (US)

(72) Inventors: David Brockhaus, Madison, AL (US); Joerg Weedermann, Santa Clara, CA (US); Christopher Cantrell, Huntsville, AL (US)

(73) Assignee: Vertiv Corporation, Westerville, OH (US)

( * ) Notice: Subject to any disclaimer, the term of this patent is extended or adjusted under 35 U.S.C. 154(b) by 91 days.

(21) Appl. No.: 17/879,231

(22) Filed: Aug. 2, 2022

(65) Prior Publication Data

US 2023/0039059 A1     Feb. 9, 2023

Related U.S. Application Data (60) Provisional application No. 63/229,051, filed on Aug. 3, 2021.

(51) Int. Cl.
| | |
|---|---|
| *H04L 67/141* | (2022.01) |
| *H04L 9/40* | (2022.01) |
| *H04L 67/146* | (2022.01) |

(52) U.S. Cl.
CPC ........ *H04L 67/146* (2013.01); *H04L 63/0876* (2013.01); *H04L 67/141* (2013.01)

(58) Field of Classification Search
CPC . H04L 67/146; H04L 63/0876; H04L 67/141; H04L 63/107; H04L 67/51; H04L 67/52
See application file for complete search history.

(56) References Cited

U.S. PATENT DOCUMENTS

| 7,555,570 B2 | 6/2009 | Hickey et al. |
| 2008/0168118 A1* | 7/2008 | Hickey ................ G06F 13/385 709/201 |
| 2010/0077118 A1 | 3/2010 | Blackwell et al. |

(Continued)

OTHER PUBLICATIONS

EP Application No. 22853793.2 Extended European Search Report, Issued May 7, 2025, 10 pages.

*Primary Examiner* — Chris Parry
*Assistant Examiner* — Steven C Nguyen
(74) *Attorney, Agent, or Firm* — Dickinson Wright PLLC (57) ABSTRACT

Systems and methods for establishing a KVM session are disclosed. The KVM session is designed to provide a communication channel between a client device and a target device without the use of an appliance. For example, the KVM session includes a virtualized KVM session in which the hardware and software used to create the communication channel are stored on a network-based device, as opposed to a multi-port appliance physically connected to the target device. A virtual KVM session eliminates the need for the target device to have a-priori knowledge related to the client device. The virtual KVM session can individually communicate with the client device and the target device, and negotiate a session between the client device and the target device prior to any communication between the target device and the client device. In some embodiments, the virtual KVM session uses out-of-band signaling and SIP to negotiate a session.

14 Claims, 7 Drawing Sheets

(56) References Cited

U.S. PATENT DOCUMENTS

| | | | |
|---|---|---|---|
| 2011/0200033 A1* | 8/2011 | Tang | H04M 3/42 370/352 |
| 2014/0280982 A1* | 9/2014 | Patel | H04W 12/033 709/227 |
| 2015/0022619 A1* | 1/2015 | Aleixo Dinis Lopes | H04N 21/6187 348/14.02 |
| 2015/0200821 A1* | 7/2015 | Sade | H04L 67/56 709/224 |
| 2016/0035183 A1* | 2/2016 | Buchholz | G07F 17/3225 463/25 |
| 2017/0163597 A1* | 6/2017 | Amerneni | H04L 61/5014 |
| 2019/0230503 A1* | 7/2019 | Circosta | H04W 12/50 |
| 2020/0351660 A1* | 11/2020 | Avetisov | H04L 63/18 |
| 2021/0006458 A1* | 1/2021 | Chew | H04L 41/04 |
| 2021/0075841 A1* | 3/2021 | Yu | H04L 65/70 |
| 2021/0289047 A1* | 9/2021 | Pathak | H04L 67/01 |

* cited by examiner

SYSTEMS AND METHODS FOR CREATING A VIRTUAL KVM SESSION BETWEEN A CLIENT DEVICE AND A TARGET DEVICE

CROSS-REFERENCE TO RELATED APPLICATIONS

This patent application claims the benefit and priority to U.S. Provisional Patent Application Ser. No. 63/229,051, filed Aug. 3, 2021 the entire disclosure of which is incorporated herein by reference.

FIELD

The following description relates to virtualizing a session between a client device and a target device. In particular, the following description relates to negotiating a session invocation between the client device and the target device prior to exchanging communication between the client device and the target device.

BACKGROUND

One technique for setting up a communication channel between a client device and a target device commonly includes an appliance consisting of several ports. When the target device is plugged into one of the ports, the appliance generally negotiates all functions (e.g., communication protocol, compatibility, setup programs, setup algorithms) related to establishing a communication session between the client device and the target devices. Additionally, the target device can also store one or more programs used to support the session.

However, the use of physical hardware (e.g., the appliance) as a middleware device has several drawbacks and challenges. For example, the number of target devices available to the client device is limited to the number of ports, and to add additional target devices requires purchasing and adding additional appliances. As another exemplary drawback, target devices generally require various features (e.g., hardware and software), and when new and/or updated features (e.g., software updates) become available, these features need to be added to each target device in order for the target device to properly function.

SUMMARY

According to some embodiments of the present disclosure, a computing device configured to manage communication between a client device and a target device is described. The computing device may include a memory device that stores executable instructions for a session signaling service and an access service. The computing device may further include a processor communicatively coupled to the memory device. The processor is configured to carry out steps that include receiving, by the session signaling service, registration information from the target device. The processor is further configured to carry out steps that include providing, by the session signaling service, the registration information to the access service. The processor is configured to carry out steps that include providing, from the access service, authorization to the client device to communicate with the session signaling service. The processor is configured to carry out steps that include when the session signaling service provides a location of the target device, initiating a session between the client device and the target device.

According to other embodiments of the present disclosure, a non-transitory computer readable storage medium configured to store instructions that, when executed by a processor included in a computing device, cause the computing device to manage communication, using a session signaling service and an access service, between a client device and a target device is described. The steps carried out by the computing device may include receiving, by the session signaling service, registration information from the target device. The steps carried out by the computing device may further include providing, by the session signaling service, the registration information to the access service. The steps carried out by the computing device may further include providing, from the access service, authorization to the client device to communicate with the session signaling service. The steps carried out by the computing device may further include when the session signaling service provides a location of the target device, initiating a session between the client device and the target device.

According to other embodiments of the present disclosure, a method for managing communication between a client device and a target device is described. The method may be carried out by a computing device that stores a session signaling service and an access service. The method may include receiving, by the session signaling service, registration information from the target device. The method may further include providing, by the session signaling service, the registration information to the access service. The method may further include providing, from the access service, authorization to the client device to communicate with the session signaling service. The method may further include when the session signaling service provides a location of the target device, initiating a session between the client device and the target device.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made, without departing from the spirit and scope of the described embodiments.

The following disclosure relates to providing a virtual session between a client device and a target device (or target devices). In current Keyboard/Video/Mouse ("KVM") functions, all negotiated KVM sessions between a KVM client, or client device, and a KVM target, or target device, are executed within a multi-port appliance. As a result, the appliance acts as a gateway between the KVM target (plugged into the appliance) and the client device, and any one or more limitations (e.g., make/model, number of ports, bandwidth, required updates, etc.) of the appliance can affect the performance of the KVM session, including the session setup.

However, by using a virtual KVM session, the appliance and its associated session setup functionality can be removed from the system, and the services for the virtual KVM session can be stored virtually (e.g., on a server, Internet, or Intranet). In some embodiments, the virtual KVM session can provide a pre-negotiated direct KVM connection between the KVM client and the KVM target(s). Additionally, the virtual KVM services use an out-of-band ("OOB") signaling method that uses multiple, separate channels for data and signaling. Also, the protocol used to initiate, maintain, and terminate the session may include a Session Initiation Protocol ("SIP") that provides an application layer protocol that works in conjunction with other application layer protocols to control multimedia communication sessions over a network or the Internet.

Unlike traditional session setups that rely upon the multi-port appliance, the virtual KVM setup protocol eliminates the need for the KVM device to have a-priori knowledge of the client device, thus simplifying client configuration. Accordingly, the KVM device can be a less sophisticated (and in some cases, lower cost) device, as the virtual KVM setup provides all the necessary negotiation and session components. In other words, the KVM device is not required to include hardware and store software used to negotiate a session with a KVM client.

Virtualization offers several additional advantages. For example, the virtual KVM setup protocol provides an offer-answer model to negotiate a physical KVM connection overcoming intermediate gateway device (e.g., appliance) bandwidth limitations. As a result, the bandwidth is based upon the network bandwidth supporting the KVM client and KVM target(s), and is no longer constrained by appliance bandwidth. As another advantageous example, any updates to session setup protocol, security updates, or other critical aspects are achieved by updating the software used to execute the virtual KVM session, including the setup protocol. These software updates can be pushed to the KVM device(s) on the network, thus eliminating the need to replace with new KVM devices or individually update KVM device software to achieve the updated information. As another advantageous example, the virtual KVM session provides a mechanism to redirect the data stream (e.g., media stream, which includes video/motion and/or textual information/data) between hardware devices (e.g., client and target devices). As non-limiting examples, the virtual KVM session, as opposed to a middleware appliance, can control KVM client access to certain KVM devices, or which user(s) can preempt other user(s) from KVM device(s).

These and other embodiments are discussed below with reference to FIGS. 1-7. However, those skilled in the art will readily appreciate that the detailed description given herein with respect to these Figures is for explanatory purposes only and should not be construed as limiting.

Figure 1:
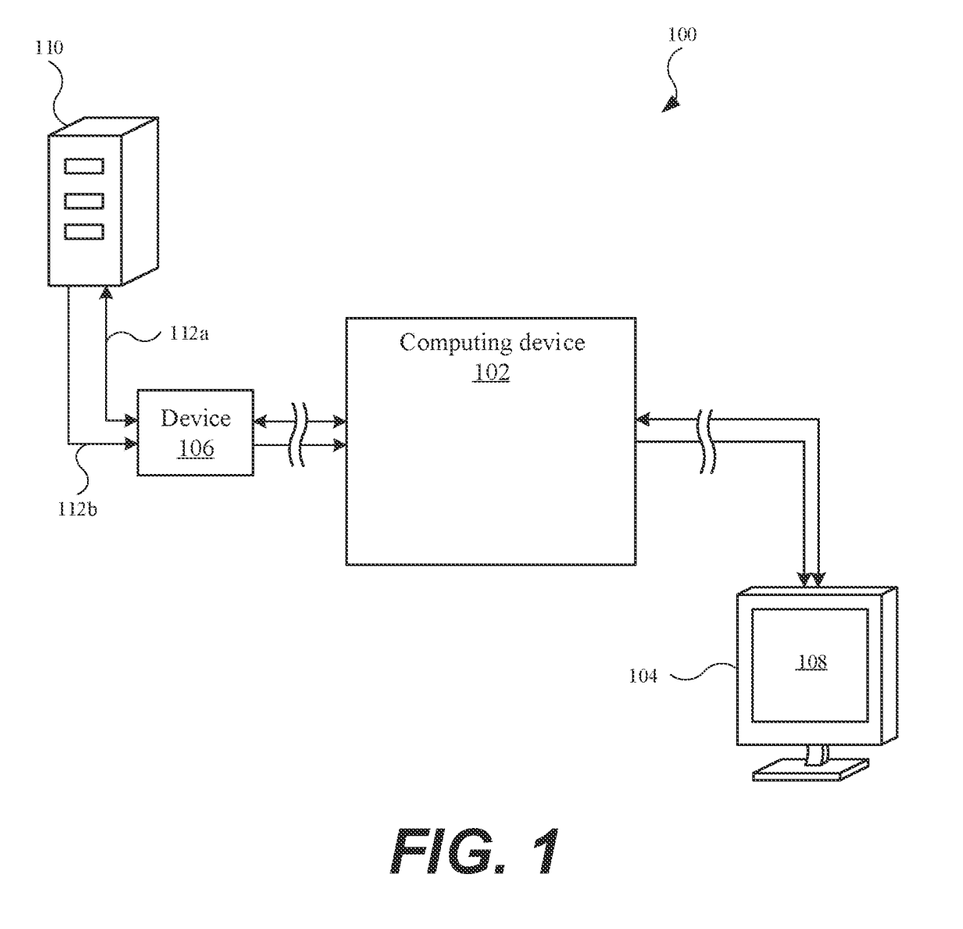
FIG. 1 illustrates a system diagram of multiple KVM devices in communication with a computing device, in accordance with some described embodiments.

FIG. 1 illustrates a diagram of a system 100 of multiple KVM devices in communication with a computing device, in accordance with some described embodiments. As shown, the system 100 includes a computing device 102 in communication with a device 104 and a device 106. The computing device 102 may include a server designed to provide various services, resources, data, and/or programs to the device 104 and the device 106. Additionally, the computing device 102 may include one or more services, including a session service and an access service, used to negotiate a session (e.g., communication) between the device 104 and the device 106. This will be further shown and described below.

The device 104 and the device 106 may each be referred to as a KVM device. For example, the device 104, also referred to as a client device, includes a display screen 108 designed to present visual information to a user. Although not shown, the device 104 may include processing circuitry (e.g., CPU, GPU) and memory (e.g., RAM, ROM) used to operate the display screen 108. Also, the device 104 may work in conjunction with other KVM devices such as a keyboard and a mouse (not shown). In some embodiments, the display screen 108 may include a touch input display screen.

The device 106, also referred to as a dongle or a target device, is used to communicate information to and from a computing device 110 (e.g., another server or desktop computing device). The device 106 can communicate with the computing device 102 in order to establish a session with the device 104, thereby allowing the device 104 to communicate with the computing device 110.

The system 100 further includes multiple communication channels, which represent a wired or a wireless communication channel. For example, the system 100 includes a communication channel 112*a* designed to place the device 104 and the device 110 in communication with each other via the computing device 102 and the device 106. In some embodiments, the communication channel 112a provides a two-way channel that allows the device 104 to provide commands and other signaling to the device 110. The system 100 may further include a communication channel 112b designed to place the device 104 and the device 110 in communication with each other via the computing device 102 and the device 106. In some embodiments, the communication channel 112b provides a data stream (e.g., media stream, including motion/video, still images, and/or textual information) from the device 110 to the device 104. The communication channels 112a and 112b form at least part of a network for the aforementioned devices.

Figure 2A:
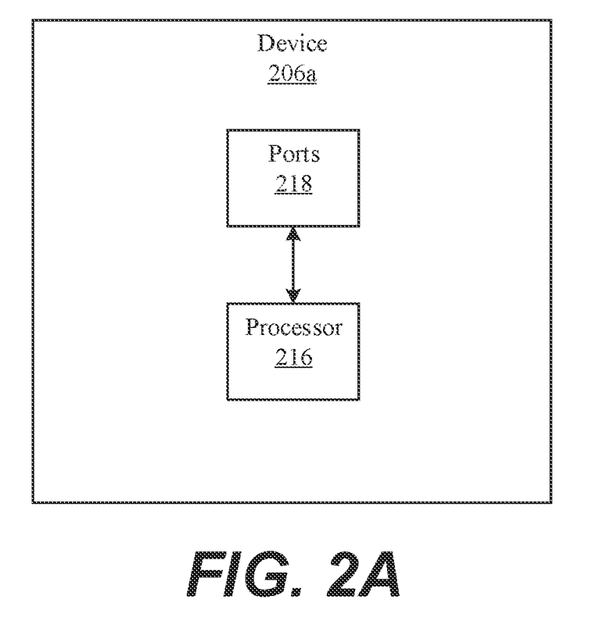
FIGS. 2A and 2B illustrate exemplary devices, in accordance with some described embodiments.
Figure 2B:
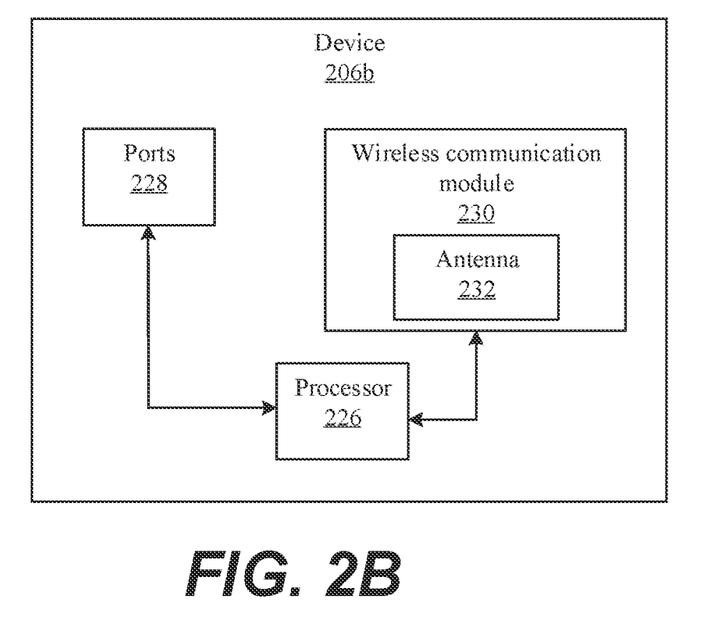

FIGS. 2A and 2B illustrate exemplary devices, in accordance with some described embodiments. FIG. 2A shows a device 206a that includes a dongle or target device designed to couple to a computing system via a network. As shown, the device 206a includes a processor 216 in communication one or more ports 218. The processor 216 is designed to send and receive information to a computing devices (e.g., computing device 102 and computing device 110, both shown in FIG. 1) via the one or more ports 218. The one or more ports 218 represent one or more physical connection points to the device 206a. FIG. 2B shows a device 206b that includes a dongle or target device designed to couple to a computing system via a network. As shown, the device 206b includes a processor 226 in communication with one or more ports 228. The processor 226 is designed to send and receive information to at least one computing device (e.g., computing device 102 and computing device 110, both shown in FIG. 1) via the one or more ports 228. The one or more ports 228 represent one or more physical connection points to the device 206b. Alternatively, or in combination, the device 206b includes a wireless communication module 230 designed to provide wireless communication to at least one computing device (e.g., computing device 102 and computing device 110, both shown in FIG. 1). The wireless communication module 230 supports transmission of data over a wireless protocol, such as BLUETOOTH® or WI-FI®, as non-limiting examples. In this regard, the wireless communication module 230 includes an antenna 232 designed to send and receive the transmission, and the wireless communication module 230 as acts as a transceiver.

Figure 3:
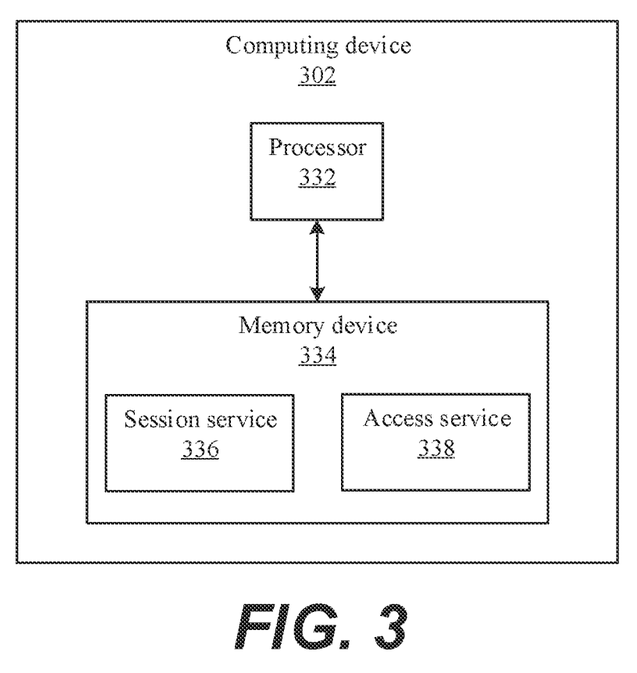
FIG. 3 illustrates an embodiment of a computing device, in accordance with some described embodiments.

FIG. 3 illustrates an embodiment of a computing device 302, in accordance with some described embodiments. The computing device 302 may include a server used to negotiate a session between two or more KVM devices, including multiple client devices and target devices. Also, the computing device 302 may include a processor 332 in communication with a memory device 334. The processor 332 may represent one or more processors, which may include a CPU and integrated circuits (including application-specific integrated circuits).

The memory device 334 may include RAM or ROM, and store a session service 336 and an access service 338. The session service 336, also referred to as a session signaling service, can support a signal interface with various KVM devices described herein. In some embodiments, the session service 336 includes an OOB signaling interface that provides separate data and signaling channels. Also, the session service 336 stores a negotiation protocol to set up a session between KVM devices. In some embodiments, the session service 336 includes SIP. The access service 338 is designed to connect a client device with a target device. In this regard, the access service 338 can perform a series of steps with the target device and with the client device, and subsequently provide, in combination with the session service 336, a pre-negotiated session between the client device and the target device. Moreover, the pre-negotiated session may occur to any communication (i.e., any initiation or exchange of information) between the client device and the target device.

Figure 4:
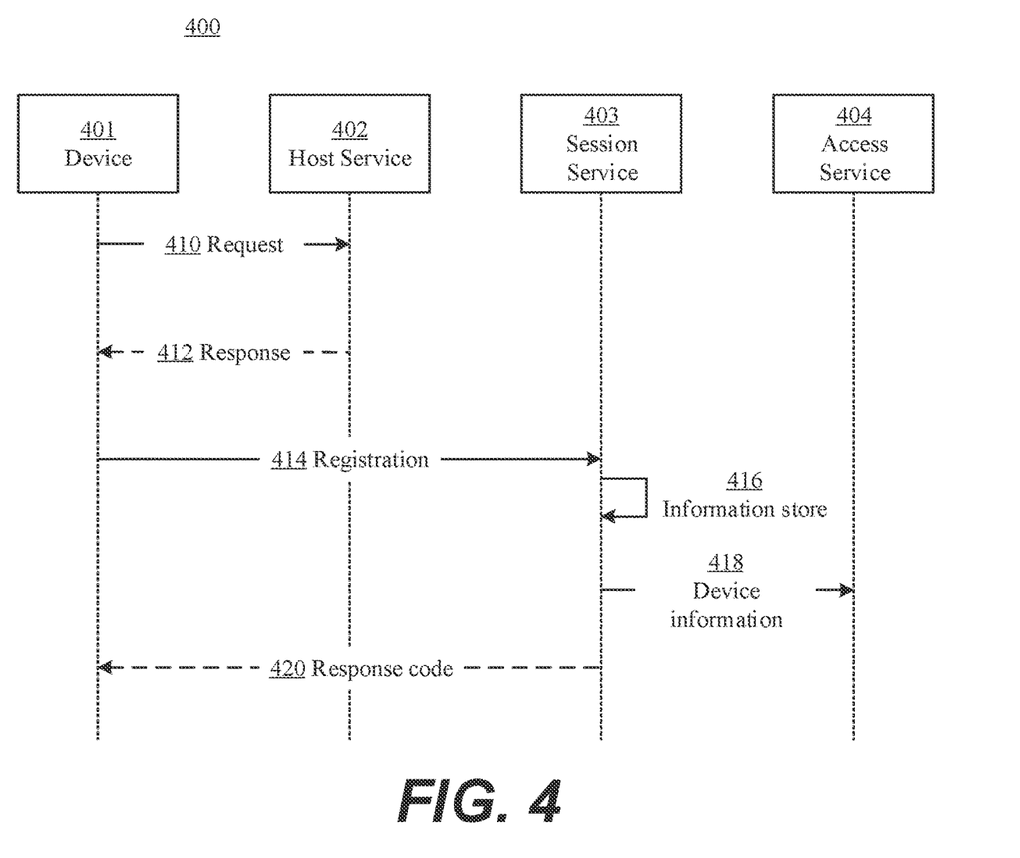
FIG. 4 illustrates a flow diagram showing a process for registering a target device, in accordance with some described embodiments.

FIG. 4 illustrates a flow diagram showing a process 400 for registering a device 401, in accordance with some described embodiments. The process 400 can be performed by a hardware/software combination located on a server (e.g., physical server, remote server, cloud server) that communicates with the device 401 through a network that includes a wired or wireless communication network.

At step 410, the device 401 provides a request to a host service 402. The device 401 may include a target device or KVM device previously described. The host service 402 may include a software package that uses a network management protocol, such as a dynamic host configuration protocol ("DHCP") service. In this regard, the request from the device 401 may include a DHCP request for an Internet Protocol ("IP") address. The host service 402 can be stored on a server that is accessible by the device 401 through a network.

At step 412, the host service 402 assigns an IP address to the device 401, and responds to the request by providing the IP address to the device 401.

At step 414, the device 401 registers (or attempts to register) with a session service 403. For example, the device 401 can send the IP address information and other contact information to the session service 403. The session service 403 may include a software package used to perform various functions, such as generating session data structures and session identifiers. Also, the session service 403 can be stored on a server that is accessible by the device 401 through a network. The server can host both the host service 402 and the session service 403, or the host service 402 and the session service 403 can be hosted on separate servers.

At step 416, the session service 403 stores the IP address information and contact information. Additionally, the session service 403 can perform various functions. For example, the session service 403 can use an encryption algorithm to enhance security of the stored information. Additionally, the session service 403 can use the encryption algorithm to hash the information as well as device key information.

At step 418, the session service 403 sends the information to an access service 404. The access service 404 may include a software package designed to provide information based on the device 401 (as well as other devices) residing on the network, provided a successful registration occurs. When the session service 403 sends the information in an encrypted form, the access service 404 may include a decryption algorithm and device key information in order to decrypt the encrypted information.

At step 420, the session service 403 provides a response code to the device 401. When the registration is successful, the response code provided by the session service 403 acknowledges the successful registration. Accordingly, the response code may include a "200 OK" response code. Additionally, the session service 403 can also provide the device 401 with which service(s) the device 401 is registered as well as any parameters with respect to how the device 401 is registered. In this regard, the session service 403 can also provide the device 401 with an authorization token (or tokens, depending on the number of services with which the device 401 is registered) as well as connection parameters. After successful implementation of the process 400, the device 401 is capable of communication with another device (or devices), provided the other device(s) is/are successfully registered using one or more services. This will be further discussed below.

Figure 5:
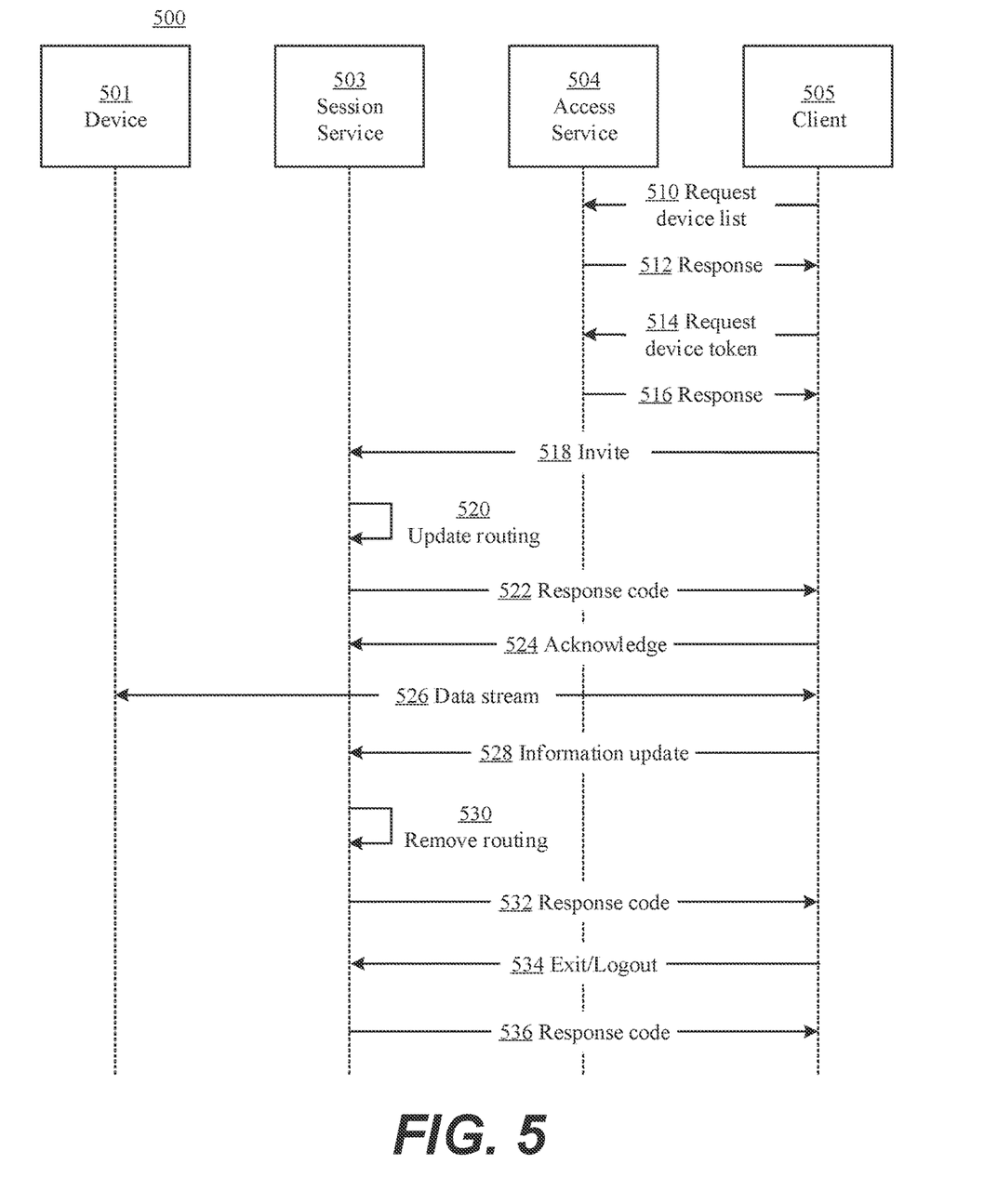
FIG. 5 illustrates a flow diagram showing a process for negotiating a session between a target and a client.

FIG. 5 illustrates a flow diagram showing a process 500 for negotiating a session between a device 501 and a client 505. The client 505 may include a client device or KVM client previously described. While the device 501 (corresponding to the device 401 in FIG. 4) is registered and on the network, the process 500 provides the steps for managing access for the client 505 and providing the network location of the device 501.

At step 510, the client 505 contacts the access service 504 (corresponding to the access service 404 in FIG. 4) with a request. The client 505 can request a list of devices (e.g., device 501 and other devices). The request may include a list of all possible devices, or the device(s) available to, or accessible/usable by, the client 505. Alternatively, the request may include a list of all devices known to the client 505.

At step 512, the access service 504 responds to the request for a list of devices by the client 505. The access service 504 can respond by providing the client 505 with a list of devices available to the client 505. Accordingly, the access service 504 can manage the request from the client 505 by generating a list of devices that the client 505 can access/use, and withhold devices from the list that are not accessible/usable by the client 505.

In order to determine which device(s) are available to the client 505, the access service 504 can use a number of methods. For example, the access service 504 can retrieve an access control list, which may include a predetermined list of authorized devices available to the client 505. Alternatively, the access service 504 can determine which devices are available to the client 505 based upon the version of the client 505. The "version" may refer to the make/model of the client 505, the current software or firmware running on the client 505, and/or the date of development or deployment of the client 505.

At step 514, the client 505 contacts the access service 504 with an additional request. The client 505 can request a device token(s) from the access service 504, with a device token representing a token-based authentication that allows the client 505 to access an application programming interface ("API") of a device (e.g., device 501 and other similar devices) on the network. Further, the requested device token(s) represents a token-based authentication that allows the client 505 access to a device that has been approved by the access service 504. In other words, the client 505 can request a device token for each device (by the access service 504) available to the client 505. Additionally, the device token provides the client 505 with instructions to contact a session service 503 (i.e., the service that supports the device 501) on the network. The session service 503 may refer to a session signaling service corresponding to the session service 403 (shown in FIG. 4). Also, the instructions may include a location of the device (e.g., device 501) or devices on the network.

At step 516, the access service 504 responds to the request for device tokens by the client 505. The access service 504 can respond by providing the client 505 with a device token for each device available to the client 505. This may include current devices on the network, or devices that could later be installed on the network.

At step 518, the client 505 contacts a session service 503 with an invite. The invite is based upon the signaling protocol used for communication. For example, when SIP is used, the invite is sent from the client 505 to the session service 503 indicating the use of SIP. In some embodiments, the SIP includes RCF3261 SIP. The process 500 uses SIP to initiate/establish communication sessions, including real-time communication sessions. Additionally, SIP further includes information related to maintaining and terminating communication sessions. Also, in some embodiments, the session service 503 includes OOB signaling, in which data and control communications are on separate channels. By using OOB signaling and SIP, the use of a middleware product (e.g., appliance) is not required. Also, it should be noted that the protocol (e.g., SIP) used for communication with the session service 503 may be used for any and all steps shown in the process 500.

Subject to accepting the invite from the client 505 and authorizing further communication, the process 500 proceeds to step 520. At step 520, the session service 503 updates the routing information on a hardware device, such as router or a switch.

At step 522, the session service 503 provides a response code to the client 505. When the invite is received, the response code provided by the session service 503 acknowledges the received invite. Accordingly, the response code may include a "200 OK" response code. Additionally, the session service 503, having registration information from the device 501 (corresponding to the device 401 from the process 400), can provide the client 505 with location information (on the network) of the device 501, provided the device 501 is available to the client 505. The location information may include the IP address as well as other setup parameters used by the client 505 to contact the device 501.

At step 524, the client 505 sends an acknowledgement to the session service 503 indicating the client 505 is available to communicate with the device 501.

Based upon the foregoing steps in the process 500 (as well as the process 400), the device 501 and the client 505 each communicate their respective information to the session service 503 and the access service 504 such that the device 501 and the client 505 can subsequently communicate with each other. Accordingly, the session service 503 and the access service 504, each composed of software packages hosted on a server(s) and available through a network, can substitute for a traditional multi-port appliance, and the multi-port appliance is no longer needed. Also, based upon the foregoing steps, the session service 503 and the access service 504 pre-negotiate all of the necessary steps, including routing updating, prior to any communication between the device 501 and the client 505.

At step 526, a setup session is initiated between the client 505 and the device 501. When the session is set up, the client 505 can provide commands to the device 501, and receive a data stream (e.g., media stream, motion/video images, still images, and/or textual information) from the device 501. Accordingly, the device 501 can provide information presentable on a display of the client 505. For example, when the device 501 is connected to a computing device (e.g., server), information (e.g., status updates, running conditions, etc.) can be sent to and presented on the display of the client 505. Based upon the process 500, the data stream can be offloaded onto the network, as opposed to being transmitted through an appliance where appliance bandwidth constraints can occur.

Additionally, the client 505 may request various updates. For example, at step 528, the client 505 can send updates to the session service 503. Such updates may include an amount of bandwidth used by the client 505 and confirmation that the session (between the client 505 and the device

501) is still active, statistical information during the session, and/or any changes to the session, color depth changes, video encoding type, and whether the client 505 is sharing the device 501 with another client (not shown in FIG. 5), as non-limiting examples. Accordingly, the session service 503 can be made aware of various changes to the session.

At step 530, the session service 503 can remove the routing. This may occur when the session between the client 505 and the device 501 is to be terminated. Using SIP, the session can be reused at a later time, either by a client 505 and a device different from the device 501, or by a subsequent session.

At step 532, the session service 503 provides an additional response code to the client 505. When the session updates/changes are received by the session service 503, the response code provided by the session service 503 acknowledges the received session updates/changes. Accordingly, the response code may include a "200 OK" response code.

At step 534, the client 505 can indicate to the session service 503 the session is terminated. The communication from the client 505 to the session service 503 makes the session service 503 (and in some cases, the access service 504) aware of the session termination. Accordingly, the communication code may include a "BYE" code.

At step 536, the session service 503 provides an additional response code to the client 505. When the session termination command is received by the session service 503, the response code provided by the session service 503 acknowledges the received session termination. Accordingly, the response code may include a "200 OK" response code.

The processes 400 and 500 offer several advantages over traditional session negotiation. For example, the session service 503 and the access service 504 manage the registration, setup, and negation of a session between the device 501 and the client 505 prior to any communication between the device 501 and the client 505, this eliminating the need for an appliance to handle any setup or negotiation. Additionally, the session service 503 and the access service 504 are designed to handle the registration and session setup (e.g., negotiation) between the device 501 and the client 505. Accordingly, the device 501 does not require specific hardware and software to perform a session setup with the client 505, and the session service 503 and the access service 504 can be decoupled/separated from (i.e., not stored in) the device 501. Moreover, the session service 503 and the access service 504 can both reside on a server(s), where the device 501 and the client 505 can each access the session service 503 and the access service 504. Additionally, due in part to the session service 503 and the access service 504 handling session setup/initiation and maintenance, the session service 503 and the access service 504 can handle other session changes such as client preemption (i.e., one client/user being able to remove another client/user), and the device 501 does not need the hardware and software to support ongoing session changes. It should further be noted that the processes 400 and 500 can be performed as part of a single process.

Figure 6:
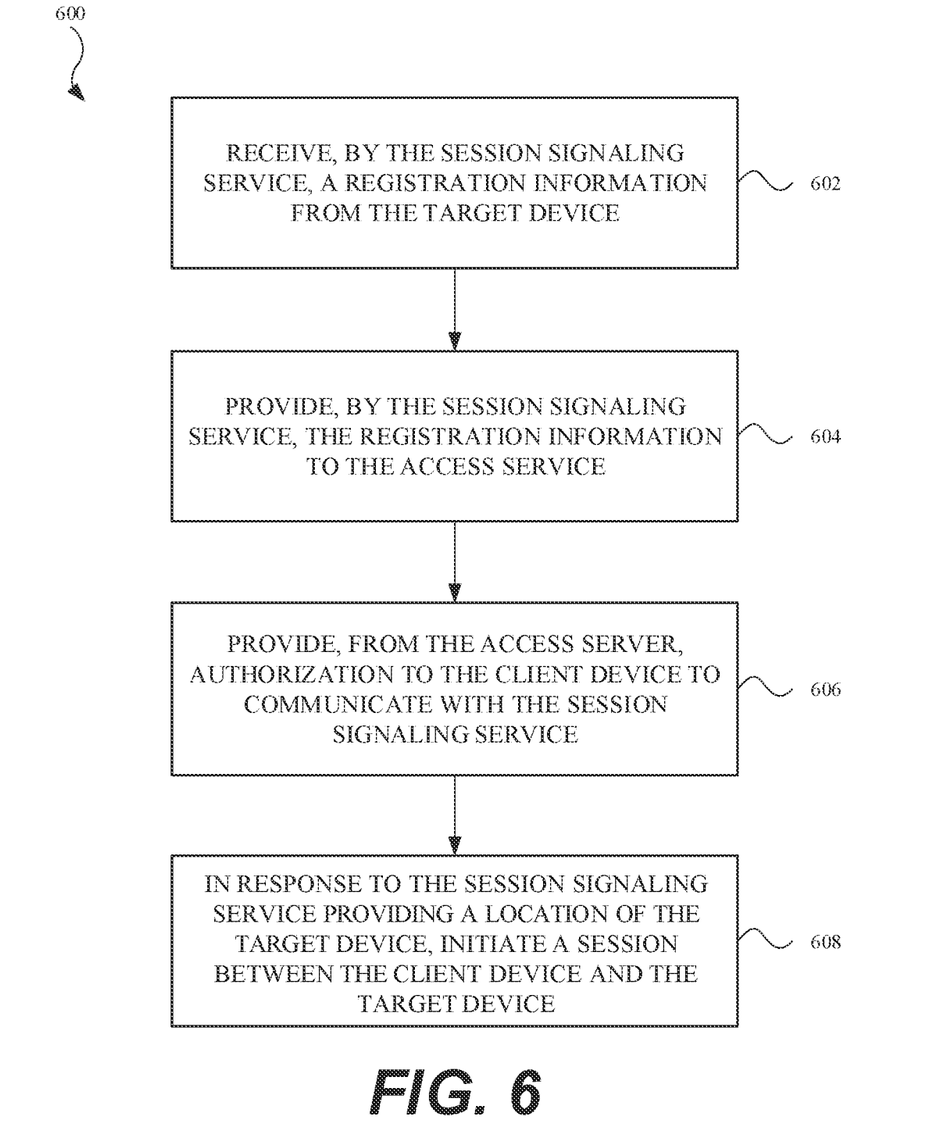
FIG. 6 illustrates a flowchart showing a method for managing communication between a client device and a target device, in accordance with some described embodiments.

FIG. 6 illustrates a flowchart 600 showing a showing a method for managing communication between a client device and a target device, in accordance with some described embodiments. The steps of the flowchart 600 may be performed by a computing device, such as a server that includes software packages including a session signal service and an access service.

At step 602, the session signaling service receives registration information from the target device. The target device can send the IP address information and other contact information to the session signaling service. In some embodiments, the target devices request and receive an IP address from a host service, such as a DHCP service. The session signaling service can store the registration information (e.g., IP address information and contact information). Additionally, in some embodiments, the session signaling service uses an encryption algorithm to enhance security of the stored information. Additionally, the session signaling service uses the encryption algorithm to hash the information as well as device key information.

At step 604, the session signaling service provides the registration information to the access service. When the session signaling service sends the information in an encrypted form, the access service may include a decryption algorithm and device key information in order to decrypt the encrypted information.

Additionally, in some embodiments, the session signaling service provides a response code (e.g., "200 OK") to the target device. Additionally, the session signaling service can also provide the target device with which service(s) the target device is registered as well as any parameters with respect to how the target device is registered. In this regard, the session service can also provide the target device with an authorization token (or tokens, depending on the number of services with which target device is registered) as well as connection parameters. After successful implementation, the target device is capable of communication with another device (or devices), provided the target device is successfully registered using one or more services.

At step 606, the access server provides authorization to the client device to communicate with the session signaling service. The access server may provide additional steps of providing a list of authorized target devices with which the client device can communicate, as well as device tokens associated with those authorized target devices. At least one device token may include information, such as the location of the target device on the network.

At step 608, when the session signaling service provides a location of the target device, a session is initiated between the client device and the target device. When the session is initiated, a data stream (e.g., commands, media stream) can be transmitted through the network between the client device and the target device. Additionally, in some embodiments, when updates to the session occur, the session signal service can receive the updates from the client device, and subsequently acknowledge the updates to the client device.

Figure 7:
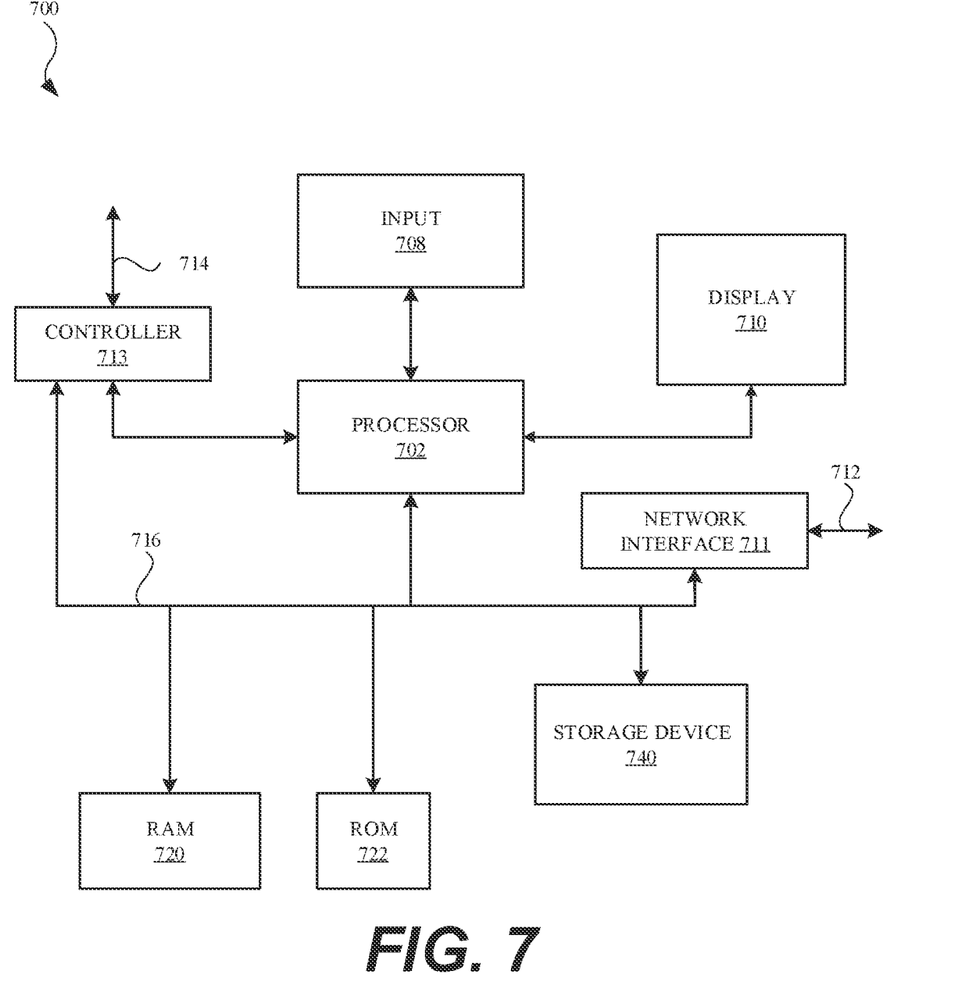
FIG. 7 illustrates a detailed view of a computing device that can be used to implement the various apparatus and/or methods described herein, in accordance with some described embodiments.

FIG. 7 illustrates a detailed view of computing device 700 that can be used to implement the various apparatus and/or methods described herein, in accordance with some described embodiments. In particular, the detailed view illustrates various components that can be included in the computing devices illustrated in FIGS. 1 and 3 and/or described herein. For example, a server described herein can include components of the computing device 700.

As shown in FIG. 7, the computing device 700 includes a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to present visual information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include a wireless transceiver.

In some embodiments, the processor 702 can be embodied in a variety of forms. For example, the processor 702 can be embodied as various processing hardware-based means such as a microprocessor, a coprocessor, a controller or various other computing or processing devices including integrated circuits such as, for example, an application specific integrated circuit (ASIC), a field programmable gate array (FPGA), some combination thereof, or the like. Although illustrated as a single processor, it will be appreciated that the processor 702 can include two or more processors. The processors can be in operative communication with each other and can be collectively configured to perform one or more functionalities of the computing device 700 as described herein. In some embodiments, the processor 702 can be configured to execute instructions that can be stored in the RAM 720 or that can be otherwise accessible to the processor 702.

The computing device 700 also include a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random-Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

In some embodiments, a computing device, configured to manage communication between a client device and a target device, includes a memory device that stores executable instructions for a session signaling service and an access service. The computing device also includes a processor communicatively coupled to the memory device. The processor is configured to carry out steps that include: receiving, by the session signaling service, registration information from the target device; providing, by the session signaling service, the registration information to the access service; providing, from the access service, authorization to the client device to communicate with the session signaling service; and in response to the session signaling service providing a location of the target device, initiating a session between the client device and the target device.

In some embodiments, the memory device and the processor are stored on a device that is separate from the target device. In some embodiments, the session signaling service and the access service are accessible via a network to the target device and the client device. In some embodiments, the steps further comprise receiving, by the access service, a device token from the client device, the device token providing the location of the target device on the network. In some embodiments, the session signaling service comprises out-of-band signaling. In some embodiments, prior to initiating the session, the target device and the client device are authorized by the session signaling service and the access service. In some embodiments, the steps further comprise, subsequent to initiating the session, receiving, by the session signaling service, an update, and providing, by the session signaling service, an acknowledgement of the update to the client device.

In some embodiments, a non-transitory computer readable storage medium is configured to store instructions that, when executed by a processor included in a computing device, cause the computing device to manage communication, using a session signaling service and an access service, between a client device and a target device, by carrying out steps that include: receiving, by the session signaling service, registration information from the target device; providing, by the session signaling service, the registration information to the access service; providing, from the access service, authorization to the client device to communicate with the session signaling service; and, in response to the session signaling service providing a location of the target device, initiating a session between the client device and the target device.

In some embodiments, the processor is stored on a device that is separate from the target device. In some embodiments, the session signaling service and the access service are accessible via a network to the target device and the client device. In some embodiments, the steps further include receiving, by the access service, a device token from the client device, the device token providing the location of the target device on the network. In some embodiments, the session signaling service comprises out-of-band signaling. In some embodiments, prior to initiating the session, the target device and the client device are authorized by the session signaling service and the access service. In some embodiments, the steps further include, subsequent to initiating the session, receiving, by the session signaling service, an update, and providing, by the session signaling service, an acknowledgement of the update to the client device.

In some embodiments, a method for managing communication between a client device and a target device includes, by a computing device that stores a session signaling service and an access service: receiving, by the session signaling service, registration information from the target device; providing, by the session signaling service, the registration information to the access service; providing, from the access service, authorization to the client device to communicate with the session signaling service; and, in response to the session signaling service providing a location of the target device, initiating a session between the client device and the target device.

In some embodiments, the session signaling service and the access service are accessible via a network to the target device and the client device. In some embodiments, the method also includes receiving, by the access service, a device token from the client device, the device token providing the location of the target device on the network. In some embodiments, the session signaling service comprises out-of-band signaling. In some embodiments, prior to initiating the session, the target device and the client device are authorized by the session signaling service and the access service. In some embodiments, the method also includes, subsequent to initiating the session, receiving, by the session signaling service, an update, and providing, by the session signaling service, an acknowledgement of the update to the client device.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A computing device configured to manage a virtual keyboard-video-mouse (KVM) session between a client device and a target device, the computing device comprising:
    a memory device that stores executable instructions for a session signaling service and an access service;
    a processor communicatively coupled to the memory device, the processor configured to carry out steps that include:
        receiving, by the session signaling service, registration information from the target device;
        providing, by the session signaling service, the registration information to the access service, wherein the access service is configured to pre-negotiate a connection between the client device and the target device, prior to communication between the client device and the target device, and wherein the target device does not have a-priori knowledge of the client device;
        providing, from the access service, authorization to the client device to communicate with the session signaling service;
        receiving, by the access service, a device token from the client device, the device token providing a location of the target device on a network;
        providing, by the session signaling service, the location of the target device;
        in response to the session signaling service providing the location of the target device:
            initiating a session between the client device and the target device, the target device requests and receives the location from a dynamic host configuration protocol service, the registration information includes the location of the target device, the session signaling service comprises out-of-band signaling comprising a first channel used for one of data and signaling and a second channel used for the other of data and signaling, the first channel is different than the second channel, and the session signaling service initiates the session between the client device and the target device using a session initiation protocol.

2. The computing device of claim 1, wherein the memory device and the processor are stored on a device that is separate from the target device.

3. The computing device of claim 1, wherein the session signaling service and the access service are accessible via the network to the target device and the client device.

4. The computing device of claim 1, wherein prior to initiating the session, the target device and the client device are authorized by the session signaling service and the access service.

5. The computing device of claim 1, wherein the steps further include:
    subsequent to initiating the session, receiving, by the session signaling service, an update; and
    providing, by the session signaling service, an acknowledgement of the update to the client device.

6. A non-transitory computer readable storage medium configured to store instructions that, when executed by a processor included in a computing device, cause the computing device to manage a virtual keyboard-video-mouse (KVM) session, using a session signaling service and an access service, between a client device and a target device, by carrying out steps that include:
    receiving, by the session signaling service, registration information from the target device;
    providing, by the session signaling service, the registration information to the access service, wherein the access service is configured to pre-negotiate a connection between the client device and the target device, prior to communication between the client device and the target device, and wherein the target device does not have a-priori knowledge of the client device;
    providing, from the access service, authorization to the client device to communicate with the session signaling service;
    receiving, by the access service, a device token from the client device, the device token providing a location of the target device on a network;
    providing, by the session signaling service, the location of the target device;
    in response to the session signaling service providing the location of the target device:
        initiating a session between the client device and the target device, the target device requests and receives the location from a dynamic host configuration protocol service, the registration information includes the location of the target device, the session signaling service comprises out-of-band signaling comprising a first channel used for one of data and signaling and a second channel used for the other of data and signaling, the first channel is different than the second channel, and the session signaling service initiates the session between the client device and the target device using a session initiation protocol.

7. The non-transitory computer readable storage medium of claim 6, wherein the processor is stored on a device that is separate from the target device.

8. The non-transitory computer readable storage medium of claim 6, wherein the session signaling service and the access service are accessible via the network to the target device and the client device.

9. The non-transitory computer readable storage medium of claim 6, wherein prior to initiating the session, the target device and the client device are authorized by the session signaling service and the access service.

10. The non-transitory computer readable storage medium of claim 6, wherein the steps further include:

subsequent to initiating the session, receiving, by the session signaling service, an update; and providing, by the session signaling service, an acknowledgement of the update to the client device.

11. A method for managing a virtual keyboard-video-mouse (KVM) session between a client device and a target device, the method comprising:

by a computing device that stores a session signaling service and an access service:

receiving, by the session signaling service, registration information from the target device;

providing, by the session signaling service, the registration information to the access service, wherein the access service is configured to pre-negotiate a connection between the client device and the target device, prior to communication between the client device and the target device, and wherein the target device does not have a-priori knowledge of the client device;

providing, from the access service, authorization to the client device to communicate with the session signaling service;

receiving, by the access service, a device token from the client device, the device token providing a location of the target device on the network;

providing, by the session signaling service, the location of the target device;

in response to the session signaling service providing the location of the target device:

initiating a session between the client device and the target device, the target device requests and receives the location from a dynamic host configuration protocol service, the registration information includes the location of the target device, the session signaling service comprises out-of-band signaling comprising a first channel used for one of data and signaling data and a second channel used for the other of data and signaling, the first channel is different than the second channel, and the session signaling service initiates the session between the client device and the target device using a session initiation protocol.

12. The method of claim 11, wherein the session signaling service and the access service are accessible via the network to the target device and the client device.

13. The method of claim 11, wherein prior to initiating the session, the target device and the client device are authorized by the session signaling service and the access service.

14. The method of claim 11, further comprising:

subsequent to initiating the session, receiving, by the session signaling service, an update; and providing, by the session signaling service, an acknowledgement of the update to the client device.

* * * * *